US012224171B2

United States Patent
Bedford et al.

(10) Patent No.: US 12,224,171 B2
(45) Date of Patent: Feb. 11, 2025

(54) ELECTROSPRAY PROBE

(71) Applicant: DH Technologies Development PTE. LTD., Singapore (SG)

(72) Inventors: Leigh Bedford, Ajax (CA); Goran Ristic, Concord (CA); Bradley B. Schneider, Bradford (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 702 days.

(21) Appl. No.: 17/440,131

(22) PCT Filed: May 29, 2020

(86) PCT No.: PCT/IB2020/055145
§ 371 (c)(1),
(2) Date: Sep. 16, 2021

(87) PCT Pub. No.: WO2020/240510
PCT Pub. Date: Dec. 3, 2020

(65) Prior Publication Data
US 2022/0157592 A1  May 19, 2022

Related U.S. Application Data

(60) Provisional application No. 62/855,606, filed on May 31, 2019.

(51) Int. Cl.
*H01J 49/00* (2006.01)
*G01N 30/72* (2006.01)
*H01J 49/16* (2006.01)

(52) U.S. Cl.
CPC ........ *H01J 49/167* (2013.01); *G01N 30/7266* (2013.01)

(58) Field of Classification Search
CPC .... H01J 49/167; H01J 49/165; H01J 49/0031; G01N 30/7266
(Continued)

(56) References Cited

U.S. PATENT DOCUMENTS

2003/0141392 A1\* 7/2003 Nilsson ................. H01J 49/167
239/690
2007/0267293 A1\* 11/2007 Finch ................. G01N 30/7266
204/601
(Continued)

FOREIGN PATENT DOCUMENTS

WO      2018069872 A1   4/2018

OTHER PUBLICATIONS

International Search Report mailed Aug. 24, 2020 in corresponding PCT App. No. PCT/IB2020/055145 (4 pages).
(Continued)

*Primary Examiner* — Michael Maskell
(74) *Attorney, Agent, or Firm* — Potomac Law Group, PLLC; Reza Mollaaghababa; Brian Hairston (57) ABSTRACT

An electrospray probe for use in an electrospray ion source is disclosed, which comprises a cannula extending from a proximal end having an inlet aperture for receiving a liquid sample containing at least one analyte to a discharge emitter end having an outlet aperture through which charged liquid droplets containing ions of said analyte are discharged, and an electrically conductive coating covering at least a portion of an external surface and at least a portion of an internal surface of said emitter end.

20 Claims, 10 Drawing Sheets

(58) Field of Classification Search
USPC .......................................... 250/281, 282, 288
See application file for complete search history.

(56) References Cited

U.S. PATENT DOCUMENTS

| | | | |
|---|---|---|---|
| 2011/0042566 A1* | 2/2011 | Dubey | H01J 49/167 |
| | | | 250/288 |
| 2016/0111242 A1* | 4/2016 | Lozano | H01J 1/05 |
| | | | 250/423 R |
| 2020/0043712 A1* | 2/2020 | Arnold | G01N 1/405 |

OTHER PUBLICATIONS

Written Opinion of the International Searching Authority mailed Aug. 24, 2020 in corresponding PCT App. No. PCT/IB2020/055145 (6 pages).

* cited by examiner

ELECTROSPRAY PROBE

RELATED APPLICATIONS

The present application is the national stage of International Application No. PCT/IB2020/055145 filed on May 29, 2020 titled "Electrospray Probe, which claims priority to a provisional patent application filed on May 31, 2019 titled "Electrospray Probe," and having an Application No. 62/855,606, which are herein incorporated by reference in their entireties.

BACKGROUND

The present disclosure is directed generally to an electrospray emitter for use in a mass spectrometer, and more particularly to an electrospray emitter for generating ions in an atmospheric pressure ionization source of a mass spectrometer.

Mass spectrometry (MS) is an analytical technique for measuring the mass-to-charge ratios of molecules within a sample, with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Mass spectrometers detect chemical entities as ions such that a conversion of the analytes to charged ions must occur before the sampling process. Due to the accuracy and sensitivity requirements for most MS applications, complex samples are generally subjected to separation techniques prior to ionization.

Over the years, various sampling techniques have been developed to convert the chemical entities within a liquid sample into charged ions suitable for detection with MS. One of the more common ionization methods is electrospray ionization (ESI) (e.g., pneumatically assisted electrospray, nano-electrospray), due to its ability to perform functions such as transfer molecules, including large macromolecules, from solution into the gas-phase as intact multiply-charged molecular ions and the ease with which it can be coupled to various sample sources including liquid chromatography and capillary electrophoresis.

A typical electrospray emission process can occur when an electrostatic force on a surface of a liquid sample overcomes surface tension. Specifically, in a typical ESI process, a liquid sample is discharged into an ionization chamber via an electrically conductive needle, electrospray electrode, or nozzle, while an electric potential difference between the electrospray electrode and a counter electrode generates a strong electric field within the ionization chamber that electrically charges the liquid sample. This can result in formation of a Taylor cone at or near an emitter tip of the electrospray electrode. A liquid jet can then be emitted from the apex of the Taylor cone. Specifically, the electric field generated within the ionization chamber causes the liquid discharged from the electrospray electrode, needle or nozzle to disperse into a plurality of charged micro-droplets drawn toward the counter electrode if the charge imposed on the liquid's surface is strong enough to overcome the surface tension of the liquid (i.e., the particles attempt to disperse the charge and return to a lower energy state). As solvent within the micro-droplets evaporates during desolvation in the ionization chamber, charged analyte ions can then enter a sampling orifice of the counter electrode for subsequent mass spectrometric analysis.

The conditions for the application of a high voltage to the liquid sample can affect the ionization performance of the electrospray probe, particularly when operating in the negative ion mode to generate negatively charged ions. When spraying samples prepared in predominantly acidified water in the negative ion mode, the maximum ESI potential is frequently limited by the onset of corona discharge. When the corona discharge onset occurs at a lower potential than the optimal spray potential, analytical performance degrades. While electrospray has been a very successful technique, there are cases where limitations of conventional electrospray can negatively impact the ability to obtain a desired sensitivity or accuracy for mass analysis.

Accordingly, there is a need for improved electrospray emitters and methods of ionizing a liquid sample.

SUMMARY

In one aspect, an electrospray emitter for use in an electrospray ion source is disclosed, which comprises an emitter comprising a cannula that extends from a proximal end having an inlet aperture for receiving a liquid sample containing at least one analyte to a distal end having an outlet aperture through which charged liquid droplets containing ions of the analyte are discharged, and an electrically conductive coating covering at least a portion of an external surface and at least a portion of an internal surface of the emitter end.

In some embodiments, the emitter end has a rounded tip. By way of example, the rounded tip can have a curved radius in a range of about 20 microns to about 200 microns, e.g., in a range of about 50 microns to about 150 microns. In some embodiments, the outlet aperture of the emitter can have a diameter in a range of about 1 micron to about 150 microns. Preferably, the outlet aperture can have a diameter in a range of about 5 microns to about 50 microns.

In some embodiments, the proximal end of the cannula is configured for coupling to a liquid chromatography (LC) column for receiving the liquid sample. In some embodiments, the cannula has a stationary phase of an LC column, such as an ion-exchange resin, disposed in a portion of the cannula upstream of the outlet aperture. In some embodiments, a different LC stationary phases, such as C18, can be disposed in one or more portions of the emitter.

In some embodiments, the cannula can have an inner diameter in a range of about 5 microns to about 150 microns.

In some embodiments, the electrically conductive coating can include any conductive material. In some embodiments the electrically conductive coating can include metallic materials such as titanium, platinum, gold, or silver. In other embodiments, the electrically conductive coating can include an alloy. In some embodiments, the conductive coating can include multiple layers formed of different metallic materials. In some embodiments, the electrically conductive coating has a thickness in a range of about 50 Angstroms to about 5 microns, e.g., in a range of 1 nm to about 1 micron.

In some embodiments, the cannula is configured to accommodate a flow rate of the liquid sample in a range of about 1 nL/min to about 5 mL/min. By way of example, the cannula can be configured to accommodate a flow rate in a range of about 100 nL/min to about 2 µL/min (microliters per minute). In some such embodiments, the outlet aperture has a diameter in a range of about 10 microns to about 40 microns.

In a related aspect, a mass spectrometer system is disclosed, which comprises an ion source having an electrospray probe for generating ions, a curtain plate having an orifice for receiving at least a portion of the ions, and one or more mass analyzers disposed downstream of the orifice of the curtain plate. The electrospray probe can include a cannula extending from a proximal end having an inlet aperture for receiving a liquid sample containing at least one analyte to an outlet aperture through which charged liquid droplets containing ions of the analyte are discharged. An electrically conductive coating covers at least a portion of an external surface and at least a portion of an internal surface of the emitter end. In some embodiments, the emitter end can include a rounded tip. By way of example, in some embodiments, the rounded tip can have a curved radius in a range of about 20 microns to about 200 microns. By way of example, in some embodiments, the rounded tip can have a curved radius in a range of about 50 to about 100 microns.

The proximal end of the cannula can be configured for coupling to a liquid chromatography (LC) column for receiving the liquid sample. Alternatively, one or more LC stationary phases can be packed into the cannula of the emitter.

By way of example, in some embodiments, a stationary phase of an LC column, e.g., C18 stationary phase, an ion-exchange resin, or any other suitable stationary phase can be disposed in a portion of the cannula upstream of said outlet aperture.

In some embodiments of the mass spectrometer, the electrically conductive coating includes any electrically conductive material. In some embodiments the electrically conductive coating includes metallic materials such as titanium, platinum, gold, or silver. In other embodiments, the electrically conductive coating includes an alloy. In some embodiments, the electrically conductive coating has a thickness in a range of about 50 Angstroms to about 5 microns, e.g., in a range of about 1 nm to about 1 micron.

In some embodiments of the mass spectrometer, the cannula can be configured to accommodate a flow rate of the liquid sample in a range of about 1 nL/min to about 5 mL/min, e.g., about 100 nL/min to about 2 µL/min. In other embodiments, the cannula can be configured to accommodate a flow rate of the liquid sample in a range of about 10 nL/min to about 1 µL/min. In some such embodiments, the outlet aperture has a diameter in a range of about 1 micron to about 150 microns. In other embodiments, the outlet aperture has a diameter in a range of about 10 microns to 40 microns.

A variety of different mass analyzers can be employed in the above mass spectrometer. Some examples of such mass analyzers include, without limitation, any of a quadrupole mass analyzer, a time-of-flight (ToF) mass analyzer, an ion cyclotron resonance mass analyzer, or an Orbitrap mass analyzer, among others.

A detector can be disposed downstream of the mass analyzer(s) for detecting ions and generating ion detection signals. An analysis module can receive the ion detection signals and generate a mass spectrum of the ions.

In a related aspect, a process for ionizing a sample is disclosed, which comprises providing an electrospray probe comprising a cannula extending from a proximal end having an inlet aperture for receiving a liquid sample containing at least one analyte to a discharge emitter end having an outlet aperture through which charged liquid droplets containing ions of said analyte are discharged, and an electrically conductive coating covering at least a portion of an external surface and at least a portion of an internal surface of the emitter end, maintaining said conductive coating at an elevated electric potential, introducing a liquid sample via the inlet aperture into the cannula so as to provide a flow of the liquid sample from the inlet aperture to the outlet aperture, where the liquid sample is discharged via the outlet aperture as a plurality of charged liquid droplets containing ions of the analyte. In some embodiments, the electrically conductive coating can be maintained at a voltage in a range of about 0 to about 7500 V for generation of positive ions and in a range of about 0 to about (−7500 V) for generation of negative ions. In some embodiments, the electrically conductive coating can be grounded, and a counter-electrode can be held at a high potential. For instance, the electrically conductive coating can be grounded, and a counter-electrode can be held at a high negative potential to generate positive ions or a counter-electrode can be held at a high positive potential to generate negative ions form the ESI emitter.

Further understanding of various aspects of the present teachings can be obtained by reference to the following detailed description in conjunction with the associated drawings, which are described briefly below.

DETAILED DESCRIPTION

The present disclosure is generally directed to electrospray probes for use in mass spectrometry systems, and more particularly to such probes having emitters that include a tip that is coated with an electrically conductive material (e.g., a metal). As discussed in more detail below, the electrically conductive coating can cover at least a portion of an external surface and at least a portion of an internal surface of the emitter's tip. Further, in many embodiments, the coated tip has a rounded, rather than a tapered, profile. Such an emitter can be employed in a variety of different electrospray probes, as discussed in more detail below.

Various terms are used herein according to their ordinary meanings in the art. The term "about" as used herein denotes a deviation of at most 10% around a numerical value. The term "substantially" as used herein denotes a deviation, if any, of less than 10% relative to a complete state and/or condition.

Figure 1A:
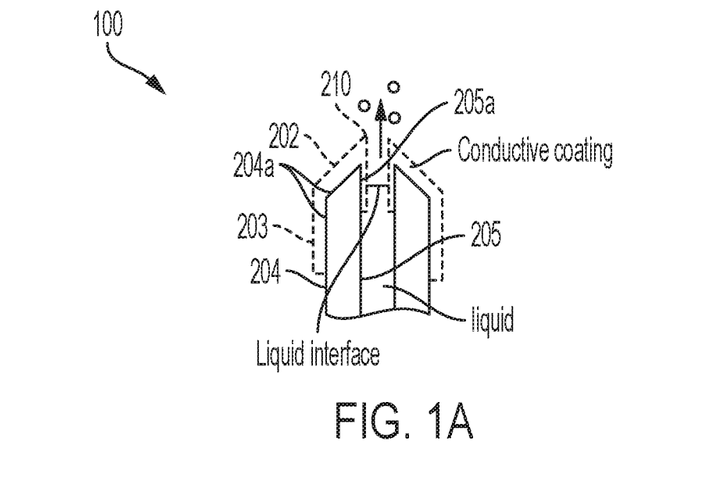
FIG. 1A is a partial schematic view of a tip of an emitter according to an embodiment, which can be employed in an electrospray probe.
Figure 1B:
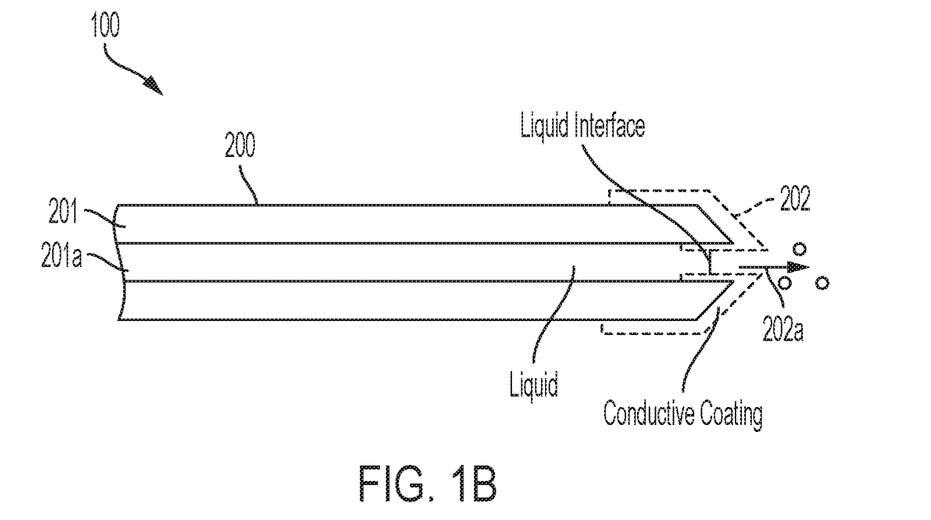
FIG. 1B is another schematic view of the emitter depicted in FIG. 1A showing the entrance inlet as well as the discharge outlet of the emitter.

FIGS. 1A and 1B show schematic views of an emitter 100 according to an embodiment of the present teachings, which can be incorporated in an electrospray probe of a mass spectrometry system, as discussed in more detail below. The emitter 100 includes a cannula 200 that extends from a proximal end 201 having an inlet aperture 201*a* for receiving a liquid sample containing, or suspected of containing, at least one analyte of interest to a discharge emitter end 202 having an outlet aperture 202*a* through which charged liquid droplets containing ions of the analyte are discharged.

The cannula 200 can be made from any suitable material known in the art. For example, the cannula 200 can be formed as a single fused silica tube or it can be formed from two or more separate portions that are coupled to one another to form the emitter. An electrically conductive coating 203 covers a portion 204*a* of the external surface 204 of the emitter's tip as well as a portion 205*a* of the internal surface 205 of the emitter's tip 210. The electrically conductive coating can be formed of a variety of different electrically conductive materials. For example, in some embodiments, the electrically conductive coating can be formed of a metal, such as, gold, silver, platinum, titanium, or any other metallic species. In some embodiments, the electrically conductive coating can be formed of an alloy. In some embodiments the electrically conductive coating can include multiple layers, such as a titanium coating with a platinum coating on top (e.g., in one such embodiment, the titanium coating can have a thickness of about 500 Angstroms and the platinum coating can have a thickness of 4000 Angstroms). In some embodiments, a thickness of the electrically conductive coating can be, for example, in a range of about 5 Angstroms to about 5 microns, e.g., in a range of about 100 nm to about 1 micron, though other suitable thicknesses may also be utilized.

The inner conductive coating 205*a* extends into the internal surface of the cannula 200. In some embodiments, the inner conductive coating can have a length (i.e., an axial extension parallel to the emitter's longitudinal axis from the outlet aperture to the end of the inner conductive coating) that is greater than the diameter of the emitter's outlet aperture. For example, the length of the inner conductive coating 205*a* can be at least about 3 times, or at least about 5 times, or at least about 10 times, the diameter of the emitter's outlet aperture. In other words, the inner conductive coating can extend into the cannula for a distance that is greater than the diameter of the outlet's aperture, such as 3 times, 5 times, or 10 times, the diameter of the outlet aperture. By way of example, the inner conductive coating 205*a* can have a length of about 60 microns, though as noted above other lengths can also be employed.

As shown schematically in FIGS. 1A and 1B, in this embodiment, the emitter tip 210 has a tapered profile. As discussed in more detail below, in other embodiments, the emitter tip can have a rounded profile.

Figure 1C:
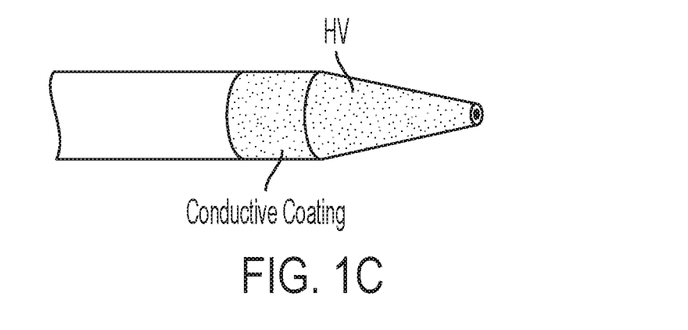
FIG. 1C shows a mechanism for applying a high voltage to a conductive coating at a tip of an emitter according to an embodiment of the present teachings.

A variety of mechanisms can be employed for applying a high voltage to the electrically conductive coating at the emitter's tip. For example, FIG. 1C shows that electrically conductive coating can be directly coupled to a high voltage source. In other embodiments, a high voltage can be applied to a counter electrode to generate an electric field at the emitter's tip for ionizing one or more analytes of a sample passing through the emitter's tip outlet aperture.

As noted above, in some embodiments, the conductively-coated tip of the emitter can have a rounded, rather than a tapered profile. For example, with reference to FIGS. 2A and 2B, such an emitter 100' includes a cannula 200' that extends from a proximal end 201' having an inlet aperture 201*a*' for receiving a liquid sample containing, or suspected of containing, at least one analyte of interest to a discharge emitter end 202' having an outlet aperture 202*a*' through which charged liquid droplets containing ions of the analyte are discharged.

Figure 2A:
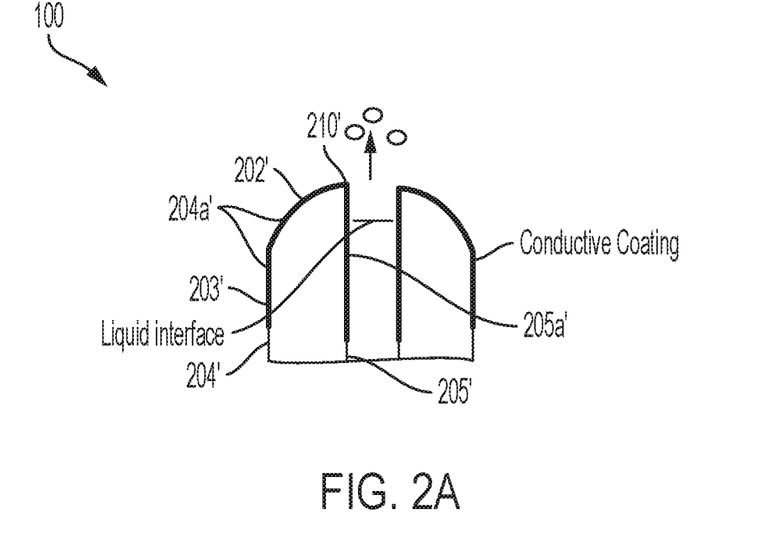
FIG. 2A is a partial schematic view of a tip of an emitter according to an embodiment in which the emitter's tip has a rounded profile.
Figure 2B:
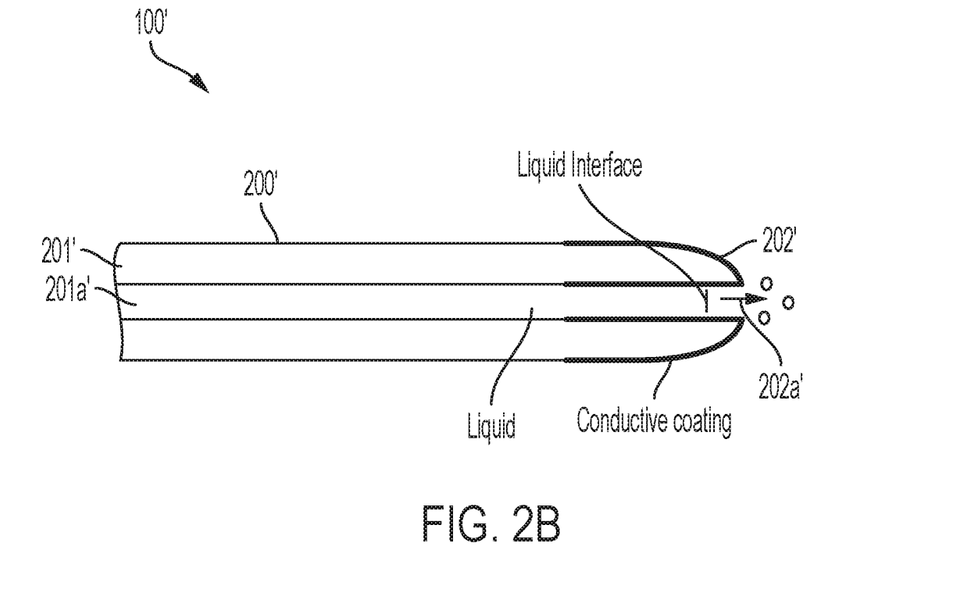
FIG. 2B is another schematic view of the emitter depicted in FIG. 2A showing the entrance inlet as well as the discharge outlet of the emitter.

An electrically conductive coating 203' covers a portion 204*a*' of the external surface 204' of the emitter's tip as well as a portion 205*a*' of the internal surface 205' of the emitter's tip 210'. The cannula 200' and electrically conductive coating 203' can have sizes and can be formed of the materials as those discussed above in connection with the previous embodiment.

In contrast to the previous embodiment, the electrically conductive coating 203' has a rounded tip 210'. In other words, unlike the previous embodiment in which the emitter's tip has a tapered profile, in this embodiment the tip 210' has a rounded profile. The rounded tip of the emitter can have a variety of different curved radii. For example, in some embodiments, the rounded tip 210' can have a curved radius in a range of about 50 microns to about 100 microns.

Figure 3A:
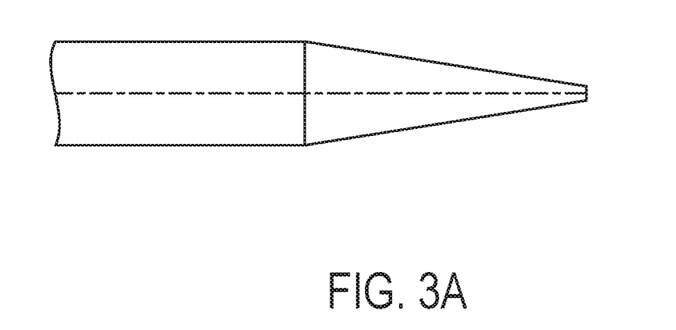
FIG. 3A is a schematic view of an emitter having a sharp tip.
Figure 3B:
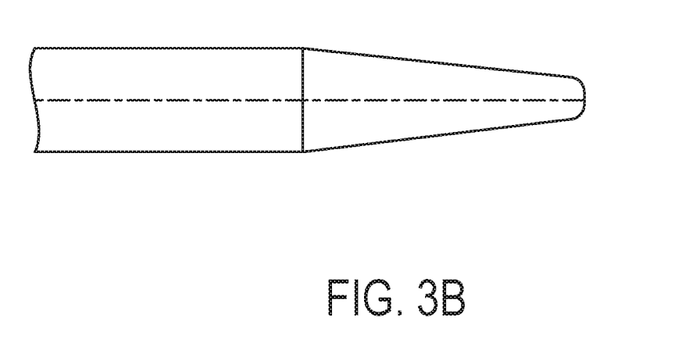
FIG. 3B is a schematic view of an emitter according to an embodiment having a tip with a rounded profile.
Figure 3C:
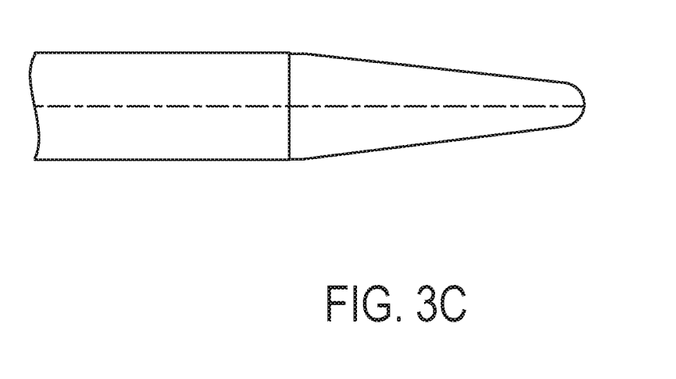
FIG. 3C is a schematic view of an emitter according to another embodiment having a tip with a rounded profile with curved radius different than that shown in FIG. 3B.

By way of further illustration, FIG. 3A shows an emitter having a tapered sharp tip. In contrast, FIGS. 3B and 3C illustrate two emitters having rounded tips in accordance with this aspect of the present teachings. The rounded tip of the emitter shown in FIG. 3C has a curved radius that is greater than the curved radius of the rounded tip of the emitter shown in FIG. 3B.

As discussed more in the Examples section below, it has been discovered that a rounded tip can ameliorate, and preferably, eliminate the formation of a corona discharge when the emitter tip is maintained at a voltage required to cause ionization of one or more analytes of a sample passing through the tip.

An emitter according to the present teachings can be incorporated into a variety of electrospray probes that can be employed in an ion source of a mass spectrometer.

Figure 4:
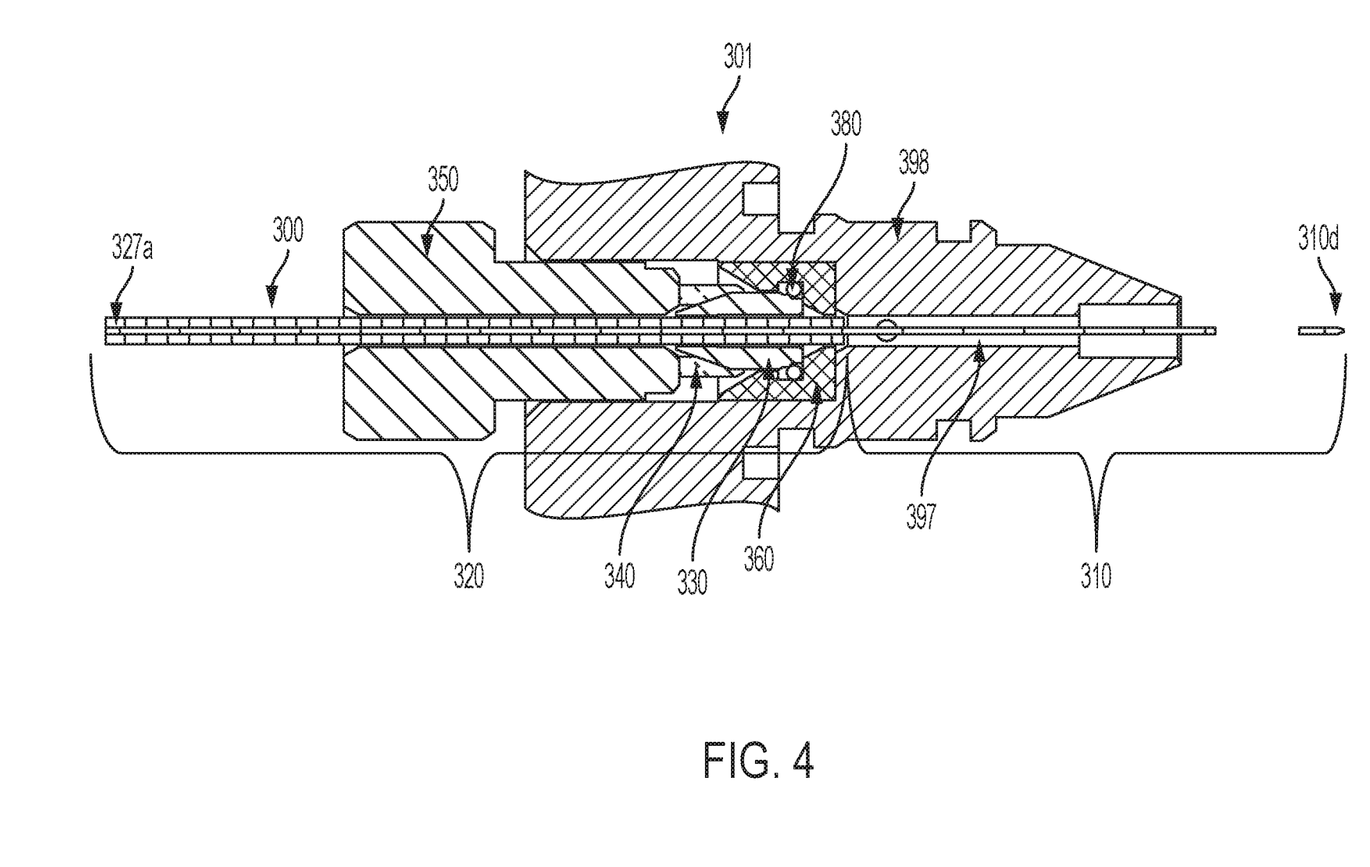
FIG. 4 is an example of an electrospray probe according to an embodiment in which an emitter according to the present teachings is incorporated.

By way of example, FIG. 4 is a cross-sectional schematic illustration of an example of an electrospray probe 301 according to an embodiment in which an emitter according to the present teachings is incorporated.

In this embodiment, the electrospray probe 301 includes a probe body 398 having a channel 397 extending therethrough in which an emitter 300 according to an embodiment of the present teachings, such as the above emitter 100, can be installed. In this embodiment, the emitter 300 includes a one-piece cannula having a lumen (herein also referred to as a channel, e.g., a microchannel) that extends from its proximal end (herein also referred to as the entrance end) 327a (fluid connection end) to an ionization discharge end 310d, and out of the probe body 398 of the probe 301. The emitter comprises a segment 310, which terminates in the conductively-coated tip of the emitter in vicinity of which ionization of a sample can occur, and a liquid conduit segment 320 formed using any suitable material, such as fused silica tubing or stainless steel. An insulating polymer, such as PEEK polymer, can be molded or extruded onto the liquid conduit segment 320 of the emitter 300. The molding or extruding of the polymer onto the fused silica can be used to form a liquid connection to an LC column. Alternatively, a sleeve can be used for mounting the emitter. The sleeve may be conductive, non-conductive, or partially conductive. The emitter 300 contains an axial depth location feature, the locating ring 330, which enables the user to install the emitter tip accurately and simply. Locating ring 330 can be secured into place with the locating nut 350 as shown in FIG. 4, which aligns the emitter into place on the locating ferrule seat 360 without the need for any further adjustment by the user. The emitter can include a ring cap 340. An O-ring 380 seals the locating ring 330 within the ferrule seat 360, thus preventing any assisting gas flow from moving back up the emitter probe body.

The molded or extruded PEEK covered fused silica can provide, on the liquid conduit segment 320, the practical OD for connecting to the LC column and receiving the fluid sample. For example, in one aspect, the liquid conduit segment can provide a tube having an outer diameter (OD) of about 1/32 or 1/16 inches or in a range from about 150 μm to about 1.6 mm for connecting to the LC column at an entrance end 327a of the emitter 300. The fused silica or stainless steel tubing can also provide, on the ionization discharge side 310d, the necessary ID for achieving the electrospray of the sample. The ID at the ionization discharge end 310d can be, for example, from about 1 μm to about 300 μm.

The above electrospray probe 300 is provided as an example of an electrospray probe in which an emitter according to the present teachings can be incorporated. It should, however, be understood that an emitter according to the present teachings can be incorporated in other electrospray probes or nebulizer assisted electrospray (ion spray) probes, as well. In other words, many different probe designs can be used with emitters according to the present teachings. For instance, in some electrospray probes in which an emitter according to the present teachings is incorporated, the axial depth feature and the ring shown in the above embodiment are not employed.

Figure 5:
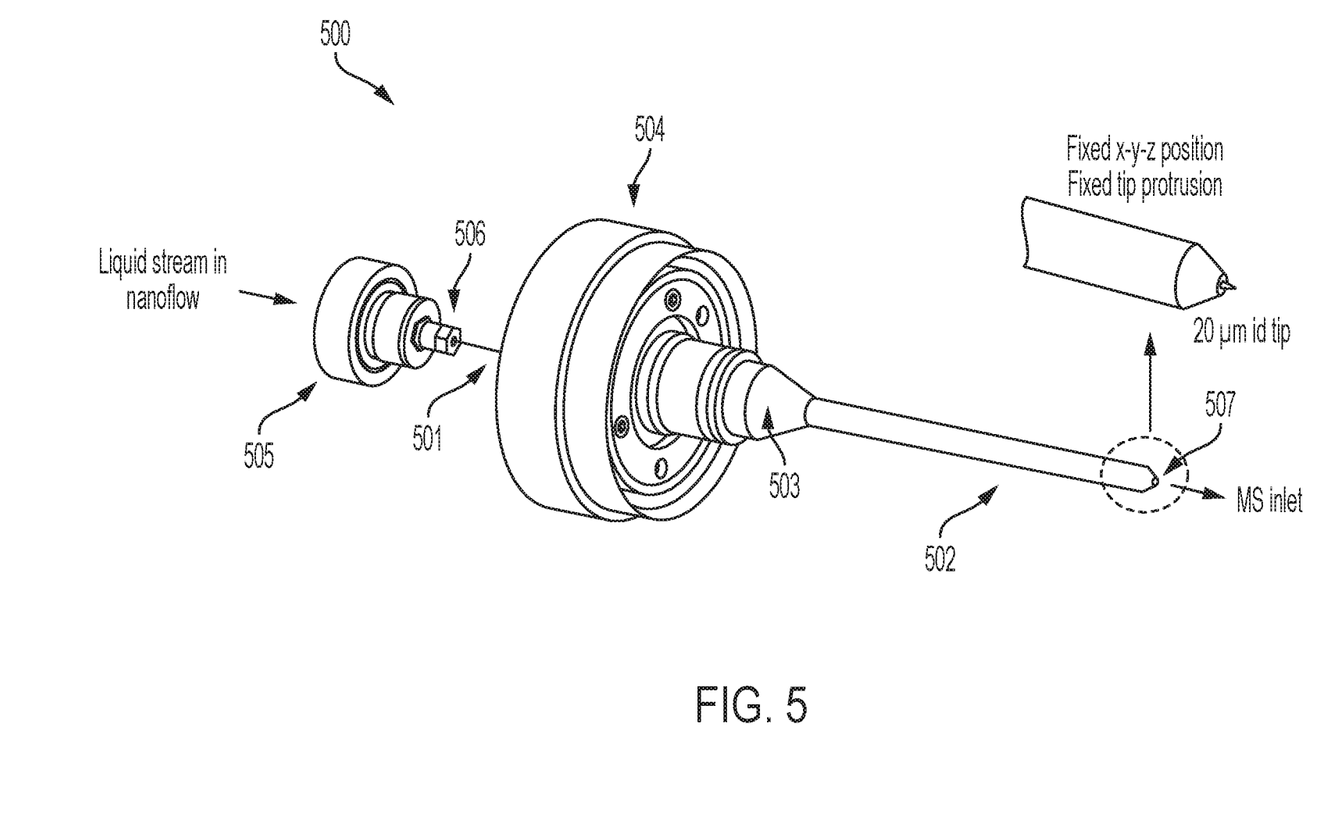
FIG. 5 is another example of an electrospray probe according to another embodiment in which an emitter according to the present teachings is incorporated, FIG. 6 schematically depicts an example of a mass spectrometer in which an electrospray probe according to an embodiment is incorporated, FIG. 7 schematically depicts an emitter according to an embodiment of the present teachings including a cannula in a portion of which a stationary phase of an LC column is disposed.

By way of example, in some embodiments, an emitter according to the present teachings can be installed in a nebulizer assembly using a ferrule and sleeve as part of an electrospray probe. For example, FIG. 5 schematically depicts another electrospray probe 500 in which an emitter 501 according to the present teachings is incorporated. The entrance end of the emitter 501 is mounted into a low dead volume union (not shown) that is held in a union holder 505. The emitter 501 is fastened in place using a sleeveless fitting 506. The emitter 501 inserts through the probe tube 502 and the union holder 505 screws onto the probe 500, such that the exit end of the emitter 501 protrudes through the probe exit aperture 507. The probe tube 502 is press fit into a PEEK holder 503. Nebulizer gas is provided through a channel in the PEEK holder 503 and flows down the probe tube 502, where it is released around the emitter 501 at the probe exit aperture 507. The ESI potential is applied to the outside of the conductive probe tube 502 and the inside of the probe tube 502 can include additional structure (not shown) such as an internal ramp or dimple to make electrical contact to the conductive coating on the emitter 501. The mounting cap 504 is used to fasten the probe 500 to an ion source.

Figure 6:
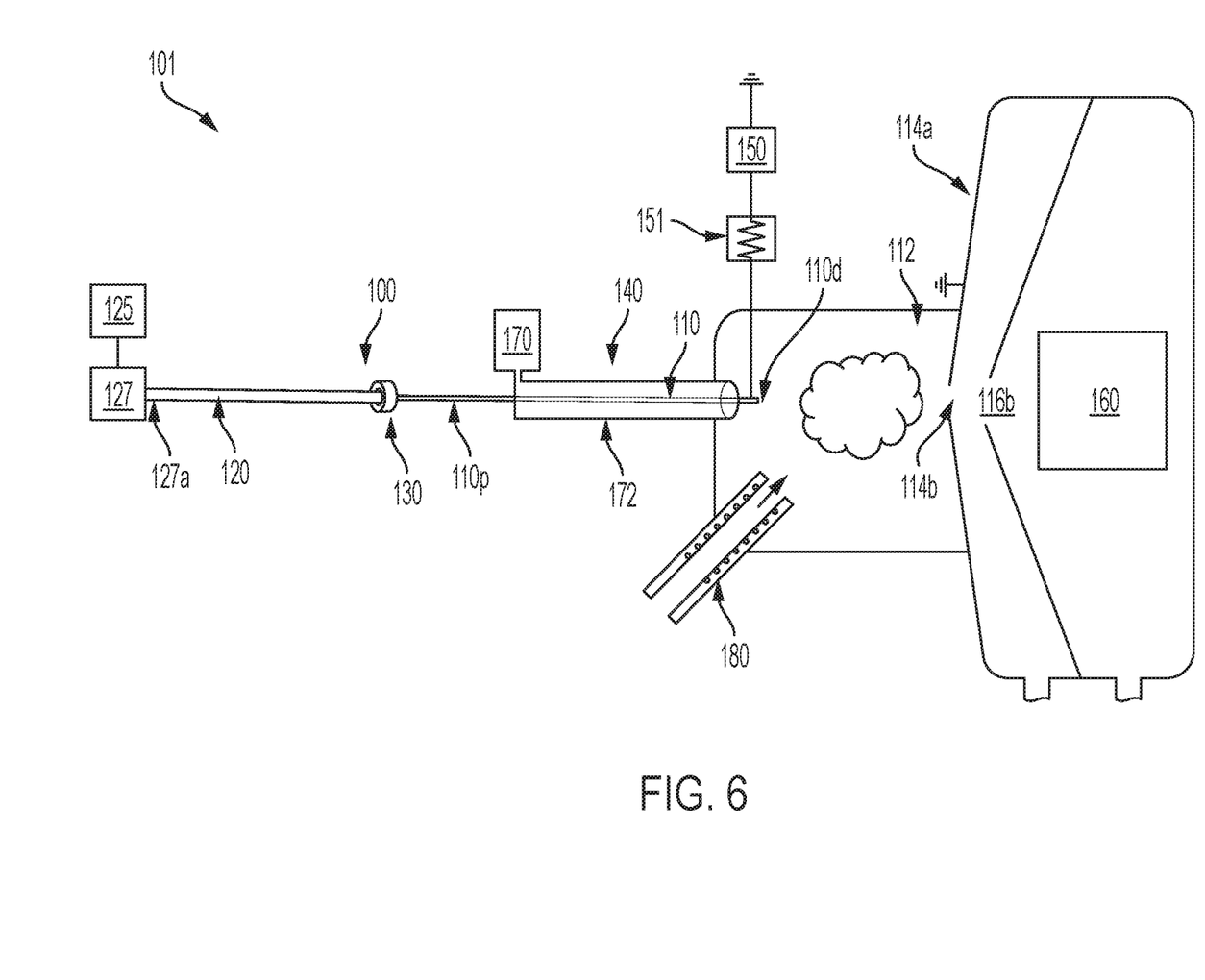

An electrospray probe according to the present teachings can be employed in a variety of different mass spectrometers. By way of example, FIG. 6 schematically depicts an example of such a mass spectrometer system 101 that includes a sample source 125 that provides a fluid sample to be ionized, an ion source 140, and a mass analyzer 160 for downstream processing of sample ions. For example, the sample source 125 can include and/or be connected to a liquid chromatography column 127. In this embodiment, the ion source includes an electrospray probe 100 according to the present teachings, such as the electrospray probes discussed above, which can provide atmospheric pressure ionization of one or more analytes in a sample.

Generally, the mass spectrometer system 101 can be fluidly coupled to a variety of liquid sample sources and configured to receive a liquid sample from those sample sources. By way of non-limiting example, the sample source 125 can comprise a reservoir (not shown) of the sample to be analyzed or an input port (not shown) through which the sample can be injected (e.g., manually or via an autosampler), infused, or input via chemical electrophoresis capillary. Alternatively or additionally, also by way of non-limiting example, the sample source 125 can be connected to and/or include an LC column (e.g., of a high-performance liquid chromatography (HPLC) system) such that the liquid sample to be analyzed can be in the form of an LC eluent. The sample source can also include an LC pump without a column for flow injection analysis (FIA), or a simple infusion pump to provide a liquid sample for analysis.

The LC column 127 is fluidly coupled to the ion source 140 and is configured such that one or more LC pumps (not shown) can deliver the eluent from the output end of the LC column 127 to the fluid connection end 127a, through the electrospray probe 100, to the input end/proximal end 110p of the ionizing discharge segment 110. The electrospray probe 100 can provide a channel (not shown), through which fluid can be transmitted from the fluid connection 127a, in fluid connection with the output end of the LC column 127, through the liquid conduit 120 and ionization discharge 110 segments of the emitter 100, to the discharge end 110d of the ionization discharge segment 110.

In some embodiments, the metal coating can include one or more layers of different metals to enhance bonding characteristics to the substrate (i.e., titanium for fused silica), while the outer layer can be chosen for its chemical and physical properties. Metals such as platinum, iridium, and tungsten and combinations thereof (alloys) can help reduce erosion of the emitter's tip during discharge. Metals such as gold and platinum can also offer superior chemical inertness. Additionally, in some aspects, the ionization discharge end can be pretreated so as to improve coating with the conductive material (e.g., via ion bombardment by at least one of Argon, Oxygen, or Neon ions to form the pretreated surface). In various aspects, the conductive coating can also be applied selectively to enhance a formation of an electric field particular to an ion generating application and/or the discharge end can be shaped to control the electric field.

As shown, the mass spectrometer 101 can additionally include a power source 150. The power source 150 can be configured to provide an electrical power to an electrical circuit 151 that includes the ionization discharge end 110d of electrospray emitter 100. The electrical power can ionize the molecules within the liquid sample (e.g., analytes of interest) as the liquid sample is discharged (e.g., sprayed) into the ionization chamber 112. Additionally, the mass spectrometer system 101 can include one or more ion emission current control mechanisms (not shown) for preventing the onset of unwanted electrical discharge between the ionization discharge end 110d and the curtain plate 114a.

The mass spectrometer system 101 can also include a source of gas 170 that is channeled through gas conduit 172 to provide means for pneumatically assisted electrospray or spray.

Figure 7:
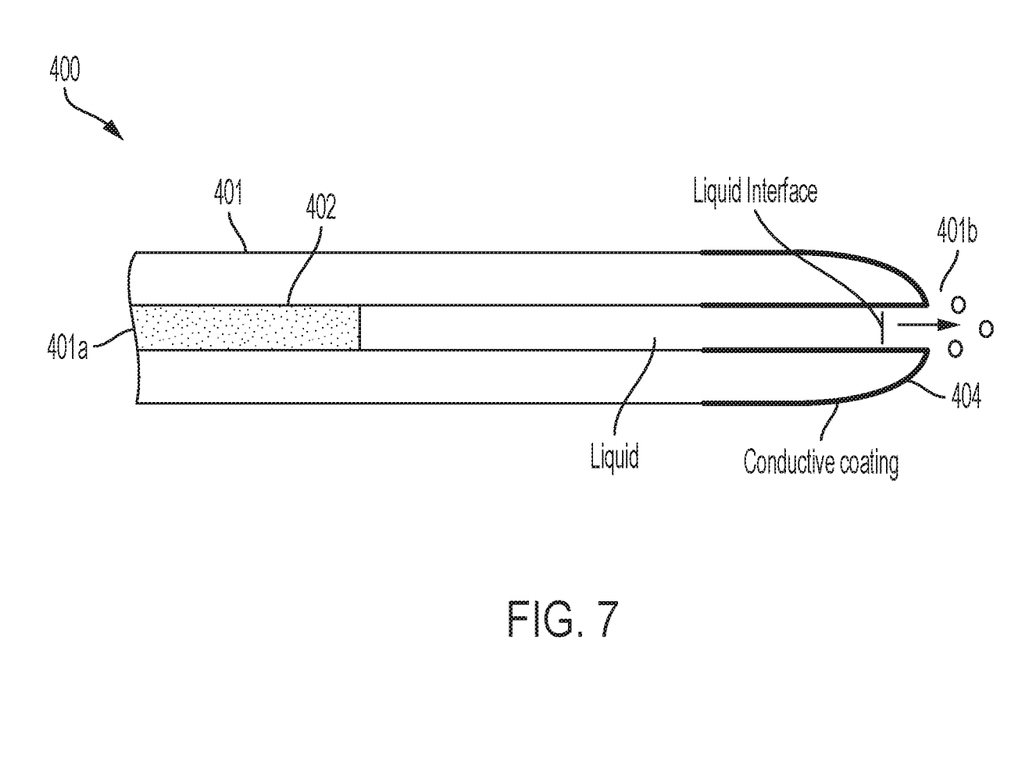

As noted above, in some embodiments, a stationary phase of an LC column (e.g., an ion-exchange resin, C18, or any other suitable stationary phase) can be disposed in a portion of the emitter upstream of its conductively-coated tip. By way of example, FIG. 7 schematically depicts an emitter 400 that includes a cannula 401 having an inlet port 401a for receiving a liquid sample containing, or suspected of containing, at least one analyte of interest and an outlet port 401b through which charged liquid droplets containing ions of the analyte of interest, if any in the sample, are discharged. The column stationary phase can fill a portion of the cannula 401, or the entire cannula. A layer of an ion-exchange resin 402 is disposed in the cannula 401 upstream of its outlet aperture. Similar to the previous embodiment, the emitter 400 includes an electrically-conductive coating 404 at its tip, which covers a portion of an external surface and a portion of an internal surface of the emitter's tip. Further, similar to the previous embodiment, the emitter's tip has a rounded profile, which can help with inhibiting the generation of a corona discharge due to a high voltage applied to the electrically-conductive coating.

The following Examples are provided for further elucidation of various aspects of the present teachings and are not provided to necessarily indicate optimal ways of practicing the present teachings and/or optimal results that may be obtained.

EXAMPLES

Figure 8:
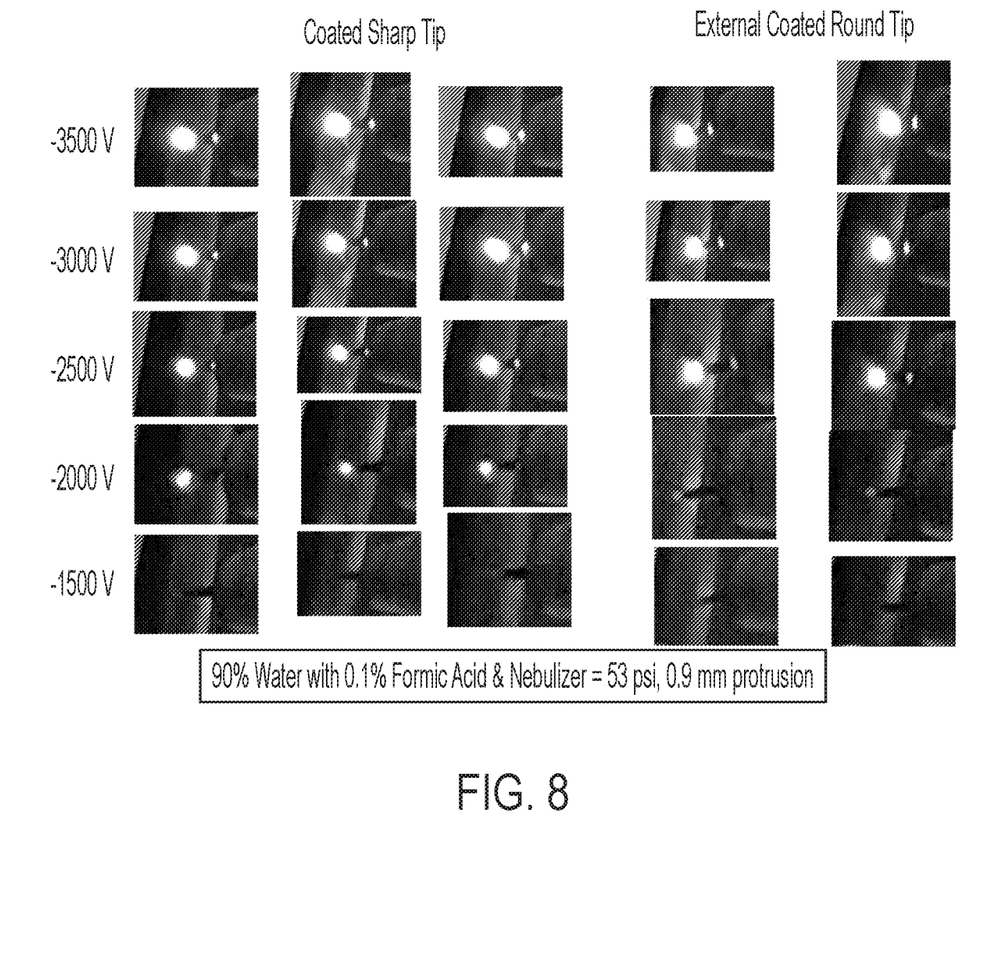
FIG. 8 shows digital photographs of emitters with different geometries, obtained during ESI (electrospray ionization) operating in a negative ion mode while spraying a sample comprising Taurocholic acid (90% water with 0.1% formic acid)

FIG. 8 shows digital photographs of emitter tips obtained using ESI (electrospray ionization) employing a 5500 QTRAP mass spectrometer marketed by Sciex Corporation of Framingham, MA, U.S.A. operating in a negative ion mode while spraying a sample comprising Taurocholic acid (90% water with 0.1% formic acid) with different electrospray probes having tips with different geometries.

Digital photographs are shown for 5 emitters (3 prior art emitters having sharp tips, and 2 emitters having rounded tips in accordance with the present teachings), which were coated with a metal on a portion of their external surface only (i.e. not internally coated) and to which different ESI potential were applied.

The photographs show that when corona discharge conditions were severe, a bright spot or corona will be visible at the tip of an ESI emitter. For the standard ground emitters (3 columns on the left side), severe corona discharge was apparent with an ESI potential as low as −2000 V. In the case of the rounded emitters (2 columns on the right side), higher ESI potentials could be applied prior to the onset of severe corona discharge, leading to improved performance.

Figure 9:
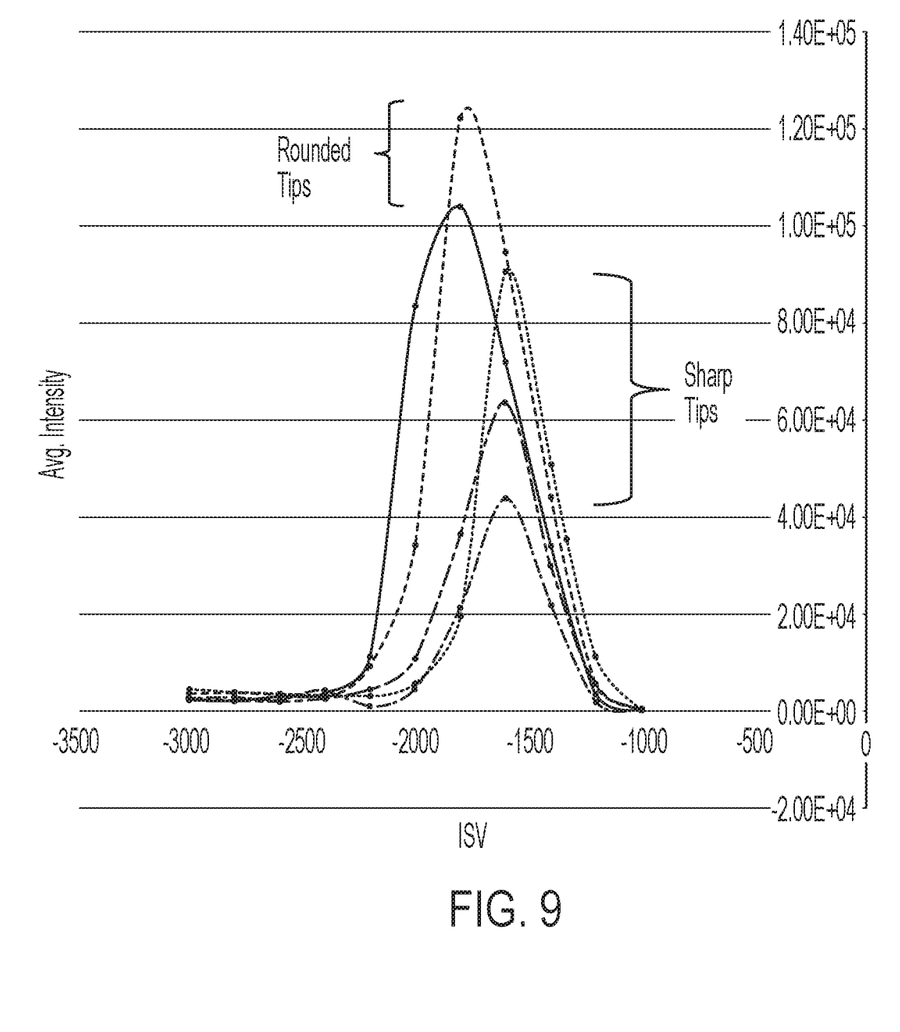
FIG. 9 presents ion signals obtained using different electrospray emitters with different tip geometries.

FIG. 9 presents data that was acquired for deprotonated taurocholic acid as a function of applied ESI potential using 5 different ESI emitters. The electric potential was increased from 0 V to approximately −3000 V. In all cases, the signal improved when the ESI potential was set more negative than −1000 V. However, when the corona discharge conditions became severe, the signal dropped off steeply. As a result of the additional 500 V that could be applied using the rounded emitters, an average signal gain on the order of 1.5× was measured using the rounded emitters. Without being limited to any particular theory, it is believed that the rounded tips exhibit better corona discharge behavior (i.e., the formation of corona discharge at operating voltages is substantially inhibited), thus improving the observed ion signal intensity.

Figure 10:
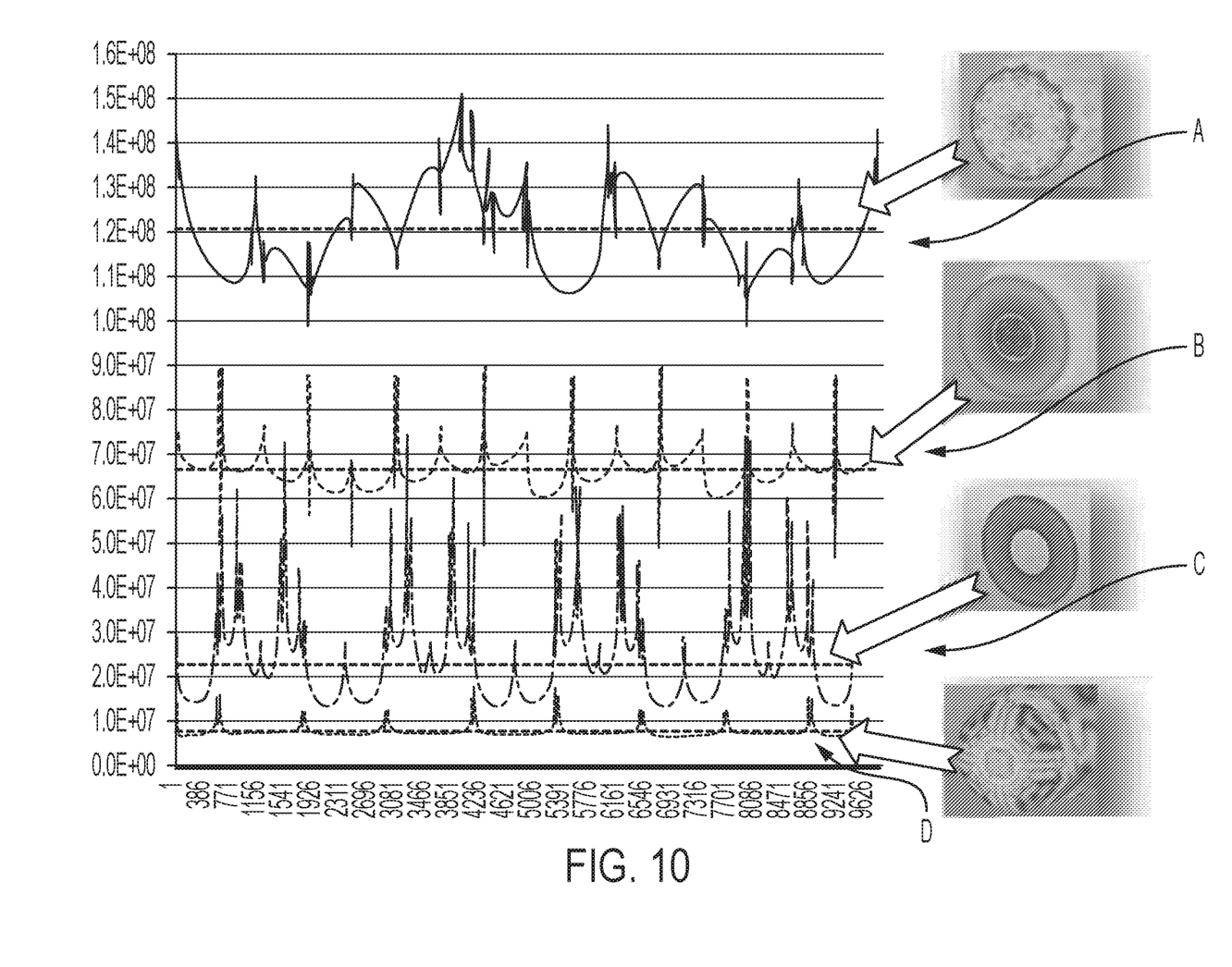
FIG. 10 shows the results of modeling the electric field strength at the tip of emitters having different geometries.

FIG. 10 shows the results of modeling the electric field strength at an emitter's tip using Lorentz software to provide additional understanding regarding the differences in the onset of corona discharge for the ground versus rounded emitters as shown in FIG. 9, discussed above.

More specifically, FIG. 10 shows modeling results for four emitter geometries. The top trace (i.e., trace A) corresponds to a prior art coated ground emitter with a general shape similar to that shown for the emitter depicted in FIG. 3A in which a sharp surface is created where the ground taper meets the front face. The modeling shows that the application of an ESI potential to this emitter geometry results in a local field hot spot with an electric field on the order of 1.2 E8 V/m.

The traces C and D show the results of electric field modeling for the rounded emitters in accordance with the emitters shown in FIGS. 3B and 3C, discussed above. Trace C shows that rounding of the outer surface of the emitter substantially reduces the maximum electric field by approximately 4×. A lower field means that higher ESI potential can be applied prior to the onset of severe corona discharge, and this in turn results in an improvement in the signal-to-noise ratio (SNR), as shown in FIG. 9. The maximum field hot spot occurs on a surface where the coated front surface of the sprayer meets the non-coated internal channel. Extension of the conductive coating into the internal channel can eliminate the field hot spot as shown in the bottom trace (i.e., trace D), where the entire outer rounded surface and the inner channel are all maintained at the same potential. In particular, the modeling shows that the average electric field across the emitter tip can be reduced by another 3-4× by extending the coating into the inside of the emitter tip.

Those having ordinary skill in the art will appreciate that various changes can be made to the above embodiments without departing from the scope of the invention.

What is claimed is:

1. An electrospray emitter for use in an electrospray ion source, comprising:
  a cannula extending from a proximal end having an inlet aperture for receiving a liquid sample containing at least one analyte to a discharge emitter end having an outlet aperture through which charged liquid droplets containing ions of said analyte are discharged, and
  an electrically conductive coating covering at least a portion of an external surface and at least a portion of an internal surface of said emitter end, wherein the at least the portion of the external surface of said emitter end and the coating covering the external surface of the emitter end include a tapered tip extending to the outlet aperture of the emitter end.

2. The electrospray emitter of claim 1, wherein the tapered tip, of the external surface and the coating covering the external surface, comprises a rounded tapering tip.

3. The electrospray emitter of claim 2, wherein said rounded tapering tip has a curved radius in a range of about 20 microns to about 200 microns.

4. The electrospray emitter of claim 1, wherein said proximal end of the cannula is configured for coupling to a liquid chromatography (LC) column for receiving said liquid sample.

5. The electrospray emitter of claim 1, further comprising a stationary phase of an LC column disposed in a portion of said cannula upstream of said outlet aperture.

6. The electrospray emitter of claim 1, wherein said electrically conductive coating comprises any of single and multilayer coating of a metal or an alloy.

7. The electrospray emitter of claim 1, wherein said electrically conductive coating has a thickness in a range of about 5 Angstroms to about 5 microns.

8. The electrospray emitter of claim 1, wherein said cannula is configured to accommodate a flow rate of said liquid sample in a range of about 1 nL/min to about 5 mL/min.

9. The electrospray emitter of claim 8, wherein said outlet aperture has a diameter in a range of about 1 micron to about 150 microns.

10. The electrospray emitter of claim 1, wherein said outlet aperture of the cannula has a diameter in a range of about 2 to about 40 microns and is configured for nanoflow electrospray ionization at flow rates less than about 2 microliters/min.

11. A mass spectrometer system, comprising:
an ion source having an electrospray probe for generating ions,
a curtain plate having an orifice for receiving at least a portion of said ions,
one or more mass analyzers disposed downstream of said orifice of the curtain plate,
wherein said electrospray probe comprises:
a cannula extending from a proximal end having an inlet aperture for receiving a liquid sample containing at least one analyte to a discharge emitter end having an outlet aperture through which charged liquid droplets containing ions of said analyte are discharged, and
an electrically conductive coating covering at least a portion of an external surface and at least a portion of an internal surface of said emitter end, wherein the at least the portion of the external surface of said emitter end and the coating covering the external surface of the emitter end include a tapered tip extending to the outlet aperture of the emitter end.

12. The mass spectrometer of claim 11, wherein the tapered tip, of the external surface and the coating covering the external surface, comprises a rounded tapering tip.

13. The mass spectrometer of claim 12, wherein said rounded tapering tip has a curved radius in a range of about 20 microns to about 200 microns.

14. The mass spectrometer of claim 11, wherein said proximal end of the cannula is configured for coupling to a liquid chromatography (LC) column for receiving said liquid sample; and optionally the mass spectrometer further comprising a stationary phase of an LC column disposed in a portion of said cannula upstream of said outlet aperture.

15. The mass spectrometer of claim 11, wherein said electrically conductive coating comprises any of a single and a multilayer coating of a metal or an alloy; and optionally wherein said electrically conductive coating has a thickness in a range of about 50 Angstroms to about 5 microns.

16. The mass spectrometer of claim 11, wherein said cannula is configured to accommodate a flow rate of said liquid sample in a range of about 1 nL/min to about 5 mL/min.

17. The mass spectrometer of claim 16, wherein said outlet aperture has a diameter in a range of about 1 micron to about 150 microns.

18. The mass spectrometer of claim 11, wherein at least one of said mass analyzers comprises a quadrupole mass analyzer; optionally, the mass spectrometer further comprising a detector disposed downstream of said one or more mass analyzers for detecting ions and generating ion detection signals; and optionally the mass spectrometer further comprising an analyzer for receiving said ion detection signals and generating a mass spectrum of said ions.

19. A process for ionizing a sample, comprising:
providing an electrospray probe comprising a cannula extending from a proximal end having an inlet aperture for receiving a liquid sample containing at least one analyte to a discharge emitter end having an outlet aperture through which charged liquid droplets containing ions of said analyte are discharged, and an electrically conductive coating covering at least a portion of an external surface and at least a portion of an internal surface of said emitter end, wherein the at least the portion of the external surface of said emitter end and the coating covering the external surface of the emitter end include a tapered tip extending to the outlet aperture of the emitter end,
maintaining said conductive coating at an electric potential difference relative to a counter electrode,
introducing a liquid sample via said inlet aperture into said cannula so as to provide a flow of the liquid sample from said inlet aperture to said outlet aperture,
wherein said liquid sample is discharged via said outlet aperture as a plurality of charged liquid droplets containing ions of said analyte.

20. The process of claim 19, wherein the tapered tip, of the external surface and the coating covering the external surface, has a rounded tapering tip.

* * * * *